US005861600A

United States Patent [19]

Jensen

[11] Patent Number: 5,861,600

[45] Date of Patent: Jan. 19, 1999

[54] FUEL PLASMA VORTEX COMBUSTION SYSTEM

[76] Inventor: Donald C. Jensen, 138 Alhambra Cir., West Palm Beach, Fla. 33405

[21] Appl. No.: 703,371

[22] Filed: Aug. 21, 1996

[51] Int. Cl.$^{6}$ .................................................... B23K 10/00

[52] U.S. Cl. ................................ 219/121.36; 219/121.48; 219/121.59; 219/121.51; 122/14; 122/19; 122/11; 431/173; 431/9

[58] Field of Search ......................... 219/121.36, 121.43, 219/121.48, 121.51, 121.54, 121.44; 310/11, 10, 308, 306; 122/33, 14, 19; 431/9, 173, 215

[56] References Cited

U.S. PATENT DOCUMENTS

| | | | |
|---|---|---|---|
| 871,070 | 11/1907 | Schwartz . | |
| 3,982,392 | 9/1976 | Crow | 60/39.65 |
| 4,154,567 | 5/1979 | Danmen | 431/5 |
| 4,297,093 | 10/1981 | Morimoto et al. | 431/10 |
| 4,683,541 | 7/1987 | David | 364/500 |
| 4,758,153 | 7/1988 | Forster | 431/208 |
| 5,321,327 | 6/1994 | Jensen | 310/11 |
| 5,359,966 | 11/1994 | Jensen | 122/14 |

FOREIGN PATENT DOCUMENTS

| | | |
|---|---|---|
| 1066155 | 6/1954 | France . |
| 2158852 | 8/1972 | Germany . |
| 2857182 | 9/1978 | Germany . |
| 853290 | 8/1981 | U.S.S.R. . |

*Primary Examiner*—Mark H. Paschall
*Attorney, Agent, or Firm*—Oltman, Flynn & Kubler

[57] ABSTRACT

A combustion system having a combustion chamber having a fuel inlet, a preheating chamber surrounding the combustion chamber, an air inlet for tangentially feeding combustion air to the preheating chamber, the combustion chamber having an elongate slot for tangentially admitting preheated air in circulating motion to the combustion chamber, a plasma chamber coupled to the combustion chamber having an inlet aperture for receiving combusting fuel-air plasma from the combustion chamber, and an outlet aperture for expelling combusted gas, the plasma chamber having an inverted end wall surrounding the outlet aperture operative for forming an imploding vortex in the plasma chamber.

10 Claims, 6 Drawing Sheets

FUEL PLASMA VORTEX COMBUSTION SYSTEM

BACKGROUND OF THE INVENTION

The invention relates to combustion systems, and more particularly to combustion systems based on imploding vortex technology, combined with ion separation of combustion gases.

An imploding plasma energy converter was previously developed by the present applicant and is the subject of U.S. Pat. No. 5,359,966, issued on Nov. 1, 1994. This prior converter, although highly efficient and practical, does not entirely maximize combustion vortex turbulence and it lacks a convenient means for finely adjusting the air-fuel ratio after full operating temperature has been reached.

As noted in this previous patent, earlier inventors have disclosed heating systems based on the principle of burning fuel in a vortex. For example, U.S. Pat. No. 2,747,526, shows a cyclone furnace in which a granular solid fuel is directed into a high velocity stream of super-atmospheric pressure air directed tangentially into a fluid cooled cyclone chamber. U.S. Pat. No. 3,597,141 discloses a burner for gaseous, liquid fuel, which has a tubular burner structure of a rotationally symmetrical shape, and which has nozzles for supplying combustion air tangentially into the combustion chamber. U.S. Pat. No. 4,297,093 discloses a combustion method which can reduce the emission of nitrous oxide and smoke by means of a specific flow pattern of fuel and combustion air in the combustion chamber, and in which secondary air is injected to create a swirling air flow.

None of the prior art, however, shows the use of applicant's concept of the so-called imploding plasma vortex, in which a vortex of burning gases is configured such that the vortex of burning gas plasma is sustained in a plasma chamber such that the vortex is "folded back" into itself, creating a double helix of burning gases at very high temperature combined with preheating of the fuel and combustion air. The principle of the imploding plasma vortex leads to a combustion process of very high thermal conversion efficiency and to a very complete combustion that minimizes polluting emissions.

It is thus an object of the present invention to provide an imploding plasma vortex combustion system which maximizes vortex formation within the system for much improved fuel efficiency.

It is another object of the present invention to provide such a system which optionally includes means for precisely adjusting the air-fuel ratio after full operational temperature has been reached to further improve fuel efficiency.

It is another object of the present invention to provide such a system which enhances ionization of the air-fuel mixture before and during combustion for still greater fuel efficiency.

It is still another object of the present invention to provide a combustion system which includes means for pre-heating air in an air-passing and rotating combustion chamber for smooth operational transition to a plasma-burning mode.

It is a further object of the present invention to provide a combustion system which is economical to construct and operate, which produces no harmful exhaust by-products and which requires very little to no cleaning or other maintenance.

SUMMARY OF THE INVENTION

According to the invention, there is provided a combustion system having a combustion chamber having a fuel inlet, a preheating chamber surrounding the combustion chamber, an air inlet for tangentially feeding combustion air to the preheating chamber, the combustion chamber having an elongate slot for tangentially admitting preheated air in circulating motion to the combustion chamber, a plasma chamber coupled to the combustion chamber having an inlet aperture for receiving combusted fuel-air from the combustion chamber, and an outlet aperture for expelling combusted gas, the plasma chamber having an inward folded end wall surrounding the outlet aperture operative for forming an imploding vortex in the plasma chamber.

According to a further feature, there is a combustion system wherein the plasma chamber is a resonating chamber, which has an internal wall of substantially spherical shape, for creating resonating waves in the chamber, and a center.

According to a still further feature, there is provided a combustion system which includes a smaller central sphere in the resonating chamber, having an inner cavity, a sonic tube fluidly connecting the inner cavity with the combustion chamber, the sonic tube being operative for transmitting sonic waves from the cavity to the combustion chamber.

According to an additional feature the central sphere has a given outside diameter and the spherical chamber has a given inside diameter, wherein the inside and outside diameters have a given harmonic ratio, the harmonic ratio being selected so as to induce standing waves in the spherical chamber.

According to another feature of the invention, there is provided a combustion system wherein a sonic tube is terminated in the combustion chamber in an exponential horn facing away from the sonic tube, the exponential horn being operative for coupling sonic waves from the inner cavity to the combustion chamber.

According to still another feature of the invention, there is provided a combustion system wherein the combustion chamber outlet aperture has an exponentially expanding diameter facing the resonating chamber.

The combustion system according to the invention may include a plenum surrounding the resonating chamber for transferring ring heat from the resonating chamber to a heat transfer medium traversing the plenum.

The combustion system according to the invention may include an ignition voltage source, and sparking apparatus in the combustion chamber coupled to the ignition voltage source for igniting fuel-air mixture circulating in the combustion chamber.

The combustion system according to the invention can advantageously include a fuel-air ratio adjusting collar forming a common end wall of the preheating chamber and the combustion chamber, the adjusting collar being adjustable in direction away from the preheating chamber and combustion chamber for adjusting the width of the elongate slot.

According to another feature of the combustion system according to the invention, the resonating chamber wall forms a cathode, the central sphere forms an anode, and an anodic reflecting disc attached to the sonic tube, the anodic reflecting disc being operative for reflecting ions from the combustion chamber.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangements shown, since the invention is capable of other embodiments. Also, the terminology used herein is for the purpose of description and not of limitation.

DETAILED DESCRIPTION OF THE PREFERRED EMBODIMENTS

Figure 1A:
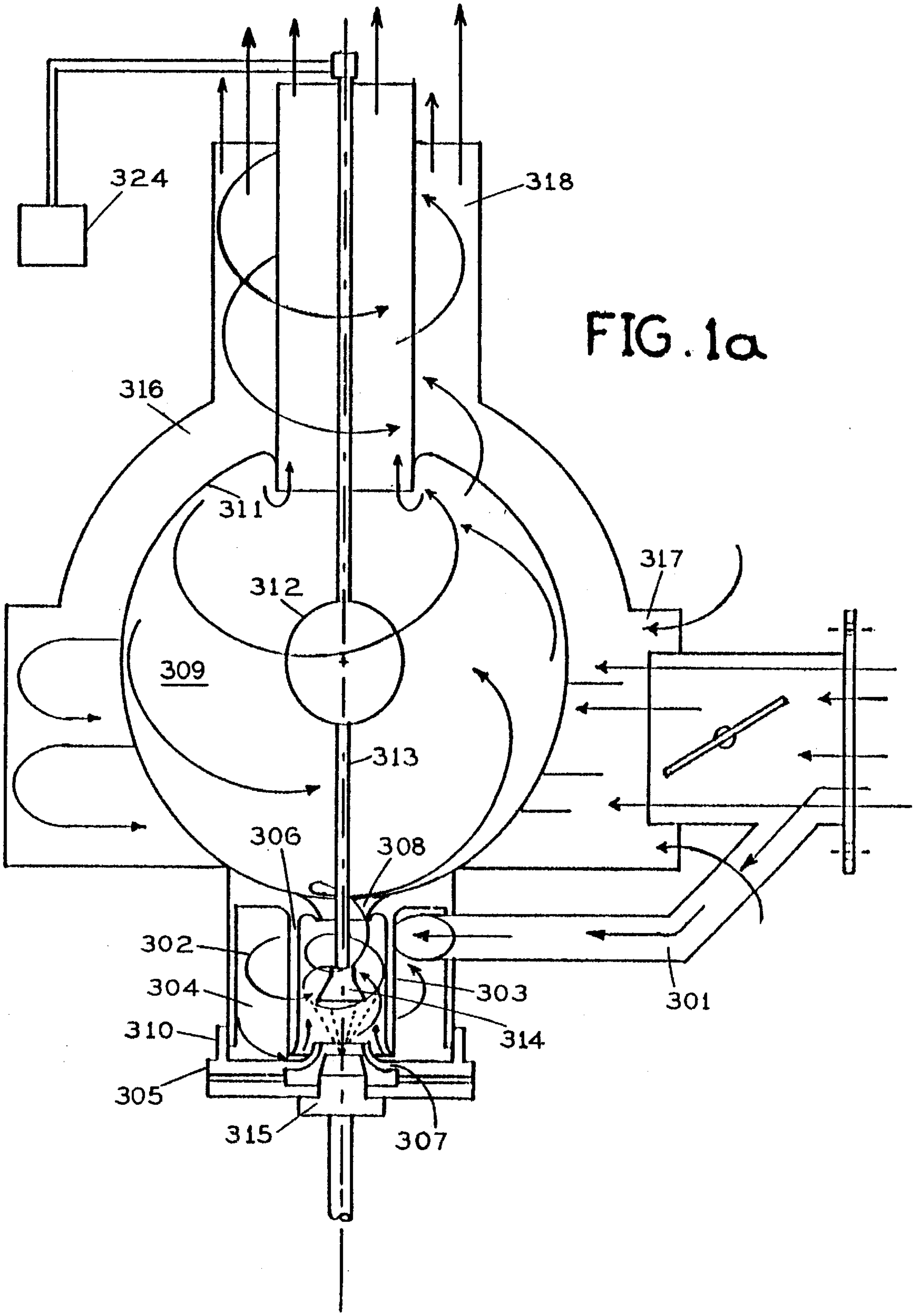
FIG. 1*a* is a simplified diagrammatic cross-sectional view of the invention seen along its centerline, and showing its basic elements including a spherical plasma chamber.

A fuel combustion apparatus shown in its basic form in FIG. 1*a* is provided with apparatus and a method of controlling and/or fine tuning an imploding vortex subsequent to combustion and to greatly increase ionization of an air/fuel mixture during combustion. Experimentation with prototypes has shown that a highly ionized combustion fluid, trapped in a high-velocity imploding vortex, produces a high-efficiency combustion of very high temperature, with highly clean exhaust emission.

To maximize the efficiency of the system, it has been found to be advantageous to fine-tune the air/fuel ratio and the vortex velocity after achieving a stable combustion temperature. According to the inventive concept, combustion air enters an air feed tube 301 from a blower (not shown) and enters a preheat chamber 304 tangentially, and follows a helical path indicated by arrows 302 around a combustion vortex chamber 303 located within the preheat chamber 304 that preheats the combustion air and cools the combustion vortex chamber wall 306. The combustion in the combustion vortex chamber 303 thereby preheats the incoming air to an approximate temperature of 1000° before entering the combustion chamber 303 through an adjustable circular slot 307 between the two chambers. The preheated air is set in motion as a high-velocity vortex as it enters the preheat chamber 304 at a tangent from the air feed tube 301. The air volume and velocity can be controlled by means of an adjusting collar 305. By reason of the high-velocity air supplied through the feed tube 301, and the high temperature in the preheat chamber 304, the angular velocity of the vortex in the combustion chamber 303 is very high and approaches several hundred thousand rpm. This forces molecules in the fuel and air to the outer periphery of the combustion chamber. This process is further enhanced by a so-called Coanda effect acting on these hot fluid gases as will be described in more detail below. As a result, a high centrifugal pressure is created at the outer periphery of the vortex and a vacuum at the vortex center. Fuel is injected from spray nozzle 315 into the vacuum at the vortex center and flashes into a fuel vapor and becomes thoroughly mixed with the preheated air from the preheat chamber 304. Due to a high degree of ionization occurring in the combustion chamber 303, the fuel/air mixture enters a plasma phase just prior to combustion. As a result, the fuel plasma is trapped within the vortex, and the outer periphery becomes negatively charged. The ions become polarized and separate into cations or anions. An ion is an electrically charged particle due to loss or gain of an electron. The cations will collect in the vortex center and are + positively charged; the anions will collect at the outer layers of the vortex and are negatively charged.

By placing a collector (anode) in the vacuum's center, electrons will flow from the cathode to the anode. It has been observed that this effect can cause electric corona discharge in the combustion chamber between various parts of the chamber. The ionic process can be further enhanced by coating the cathode and/or anode with various materials, or by introducing potassium, salts, lithium or other catalysts into the fuel or air supply.

The electrons flowing between the cathode and anode form an electric current which can be directed to a step-down voltage converter to be utilized as electric energy for various purposes including in an oscillator to be fed back to the cathode in a harmonic, resonant frequency designed to enhance the ionization of the fuel plasma and system.

A high degree of stress is placed on the molecular and atomic structures of the gases trapped within the imploding vortex in the combustion chamber 303 as the temperature within this chamber has been measured to exceed 3000° F., and the rotational velocity of the vortex has been measured to exceed several hundred thousands of rpm, resulting in supersonic velocities of the combusting plasma. Under these conditions, resonant oscillations are generated in the plasma that can be utilized to cause molecular disruption of the fuel plasma and a very high degree of co-mingling of the hydrocarbon fuel molecules with the oxygen molecules contained within the preheated combustion air.

The combustion gases are discharged through a circular exponentially expanding outlet aperture 308 leading from the combustion chamber 303 into a spherical chamber 309 wherein they, because of the centrifugal force and the Coanda effect, expand following the inner contour of the spherical chamber 309.

The expansion causes the gas particles to collect and stratify along their continued rotational motion at the periphery of the spherical plasma chamber 309, which is the hottest location within the spherical plasma chamber 309. Because of the high velocity and their high temperatures, the molecular and atomic particles are highly agitated, causing many collisions between the electrons and gas particles and thereby causing ionic exchange of energy between the particles. Due to the latent instability of a hot plasma, the collisions cause supersonic and/or ultrasonic sound waves in the plasma. The waves are reflected from the chamber wall and reverberate between the spherical chamber walls 311 and converge toward the center of chamber 309. A small sphere 312 is located at the center of the spherical plasma chamber 309. The purpose of the small sphere 312 is to cause harmonic resonant frequency oscillations in the plasma between the larger chamber wall 311 and the small sphere 312. To insure continuity of these oscillations, the size and the ratio between the diameters of the small sphere 312 and the spherical chamber 309 must be chosen within certain values. Also, the flexibility of the material of the small sphere 312 and the spherical chamber wall 311 is important. When the proper conditions are present, harmonic oscillations will develop within the interior space of the small sphere 312 that will be of a certain high or ultra-high frequency. These oscillations are directed through a sonic tube 313 terminating in a horn 314 in the combustion chamber 303. The oscillations are ultrasonic and further operate to rupture and/or disintegrate the molecules in the combustion gases in the chamber 303 so as to enhance creation of clean combustion of most any fuels. This combustion process creates a very high carbon dioxide content, resulting in very low combustion residues.

The combustion apparatus according to the invention is advantageously constructed as a multi-fuel combuster, meaning that it can burn both liquid and gaseous fuel. For this purpose, liquid or gaseous fuel can be introduced through an appropriately configured nozzle 315 for introducing the fuel into the vacuum of the vortex center of the combustion chamber 303. Gaseous or any other fuel can be introduced through a separate inlet of the adjusting collar 305. Due to the high velocity vortex and the Coanda effect of the fluids, a vacuum exists in the center of the combustion chamber 303. The adjusting collar 305 can have any suitable number of inlets for catalyst, air, water vapor or other suitable substance of elements for any suitable purposes such as enhancing the combustion and/or disintegrating any undesirable gases or liquid pollutants.

The sonic tube 313 operating as an anode may advantageously be fitted with an adjustable disk electrode not shown in FIG. 1*a*, but seen in FIG. 2*b* at reference numeral 9. By adjusting this electrode 9 to establish resonance between the electrode and the combustion chamber discharge aperture 308, a toroidal vortex can be established within the anode and cathode thereby greatly increasing the ionization process which, in turn, can establish a larger energy output from the combustion cycle. This is somewhat similar to a plate and hollow cathode discharge chamber, disclosed in the USSR publication, Gundersen, M. A. and Schaefer, G. (1990), Physics and Applications of Pseudosparks", Plenum Press, N.Y.

FIG. 2*b* shows the apparatus of FIG. 1*a* in more detail with the same reference numerals indicating similar structures, but with material thicknesses and slightly different geometries in some areas of the device.

Important additional structures are elements related to the support and functions of the small sphere 312.

As described above, a high velocity imploding plasma vortex is present in the spherical resonating plasma chamber 309, and in the combustion chamber 303. Due to the high velocity of the plasma vortex, the ions of which the plasma is composed are separating into cations and anions, as described above under FIG. 1*a*. As a result, the small sphere 312 becomes positively charged while the wall of the spherical combustion plasma chamber 309 becomes a negatively charged cathode since they are electrically insulated from each other. As described above, the plasma, which is inherently unstable, in the spherical resonating plasma chamber 309 forms radially oscillating standing waves.

The small sphere 312 is supported on a support tube 321, threaded through the electrically insulating exhaust outlet 7. The support tube 321 is mounted on radially extending support flanges 10,11. The support tube 321 is made of a high temperature, electrically conducting material or alloy, and is at its distal end 322 electrically connected to a high voltage electrical conductor 323 having an insulated outlet 8 connected to electrical apparatus 324 (FIG. 1*a*), as described in more detail below.

The small sphere 312 provides an electrical connection from the support tube 321 to the sonic tube 313 which extends from the small sphere 312 into the combustion vortex chamber 303, wherein the sonic tube 313 is terminated in the horn 314. An anodic element 9 is mounted on the sonic tube 313 at a certain given distance from the resonating chamber inlet 308. The anodic element in its simplest form is a planar disc, but can have other forms such as spherical, paraboloidal or the like, curved away from or toward the inlet 308.

In operation during combustion, the anodic element 9 is set at a distance from the inlet 308 such that resonance is established between the inlet and the anodic element 9. Under this condition a toroidal vortex is formed in the plasma between the anodic element 9 and the inlet 308, which in this case forms and acts as a cathode to the anodic disc element 9. The toroidal vortex greatly increases the ionic process which in turn establishes a larger energy gradient within the combustion cycle.

Combustion is initially started by injecting fuel in liquid or gaseous form at the nozzle 315, simultaneously supplying combustion air at the air feed tube 301. Ignition is started e.g. by supplying ignition voltage at the electrical conductor 323. The ignition voltage is conducted via the support tube 321 via the small sphere 312, and via the sonic tube 313 to the horn 314, from where an electric spark from the horn 314 to the inner wall of the combustion vortex chamber 303 causes ignition of the fuel-air mixture. After ignition combustion proceeds as described above with the formation of an imploding vortex in the resonating plasma chamber 309.

The imploding vortex combined with the resonating standing waves in the resonating chamber, and further enhanced by the toroidal vortex between the anodic element 9 and the inlet 308 leads to a highly efficient combustion with a high content of carbon dioxide in the exhaust gases exiting through the exhaust outlet 7.

As a result of the sustained combustion and the rising temperatures in the combustion system, an adjustment of the fuel-air ratio may be required by adjusting the adjustable slot 307 to the optional combustion conditions. The adjustment is performed e.g. by rotating the adjusting collar 305, which is threadedly connected to the resonating plasma chamber 309 by screw threads 310.

Figure 1B:
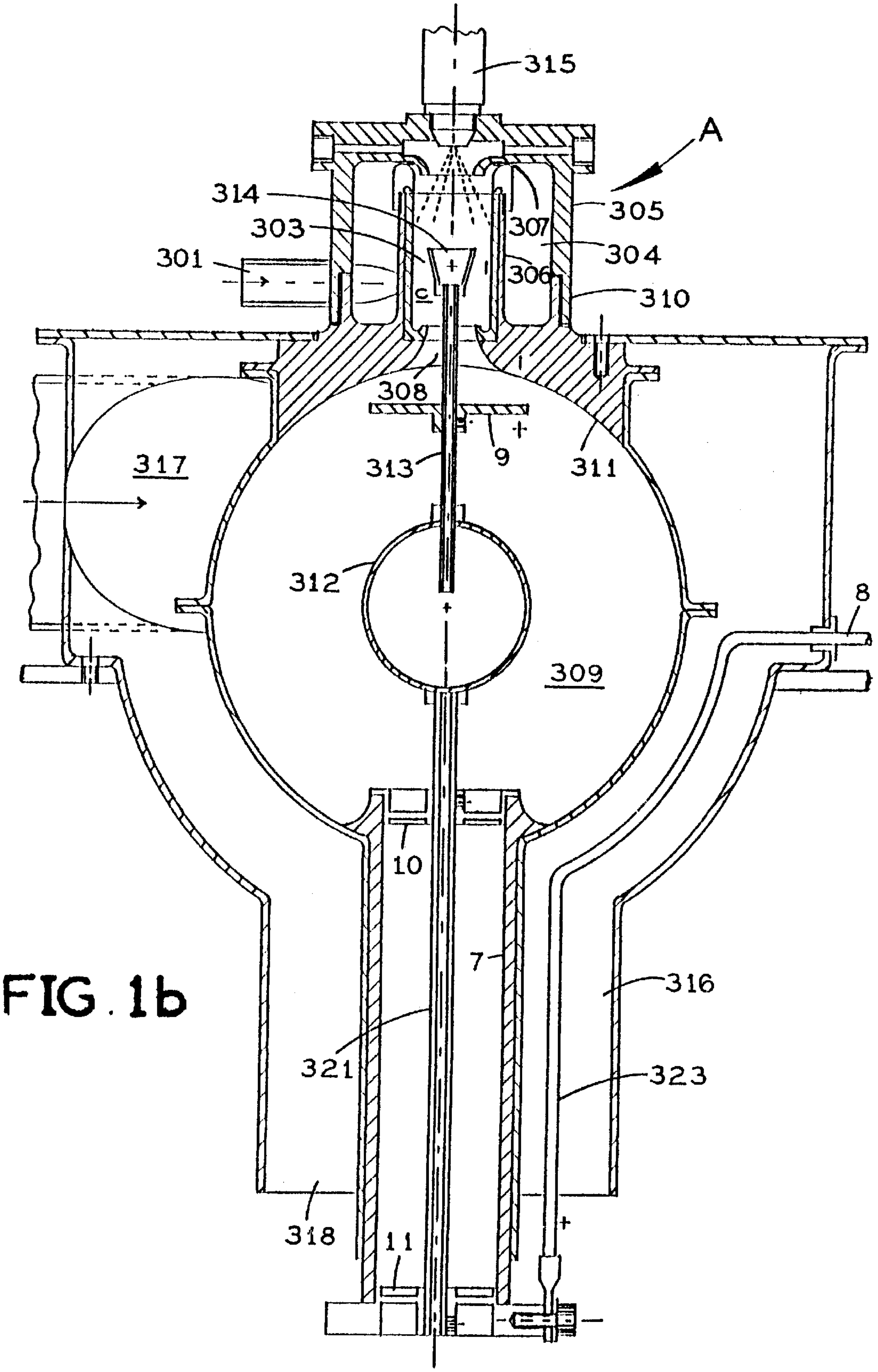
FIG. 1*b* is a more detailed cross-sectional view of the invention according to FIG. 1*a* showing a spherical resonating plasma chamber, and details of an anodic reflecting element.
Figure 1C:
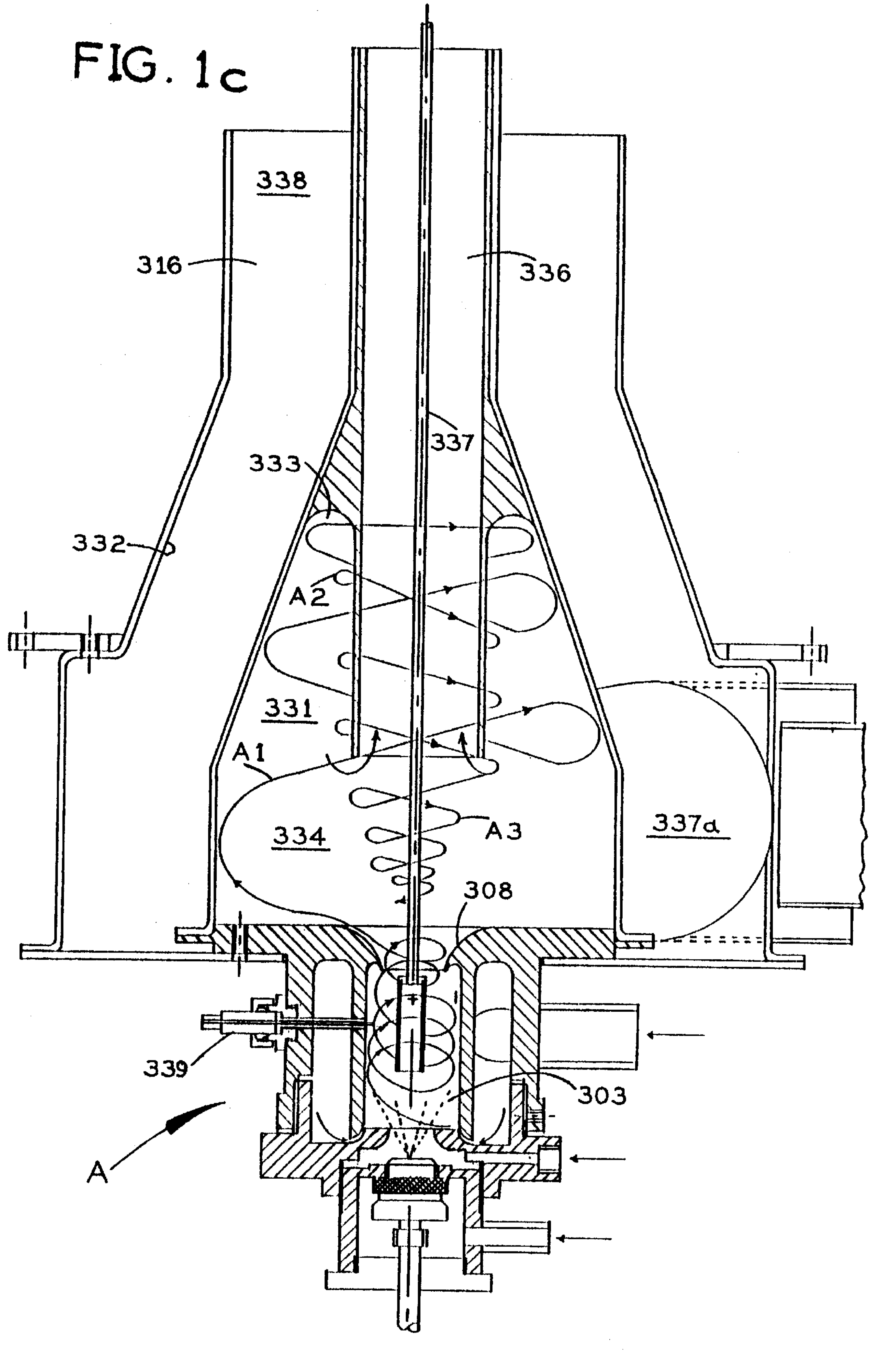
FIG. 1*c* is a still more detailed cross-sectional view of the invention having a plasma chamber shaped as a frustoconical chamber.

FIG. 1*c* shows an embodiment of the invention wherein the combustion chamber assembly shown generally at A is substantially similar to that of FIG. 1*b*, described in detail above. The embodiment of FIG. 1*c* is different from FIG. 1*b* in that a frusto-conical plasma chamber is provided instead of the spherical resonating chamber 309 shown in FIG. 1*b*.

The frusto-conical plasma chamber 331 has the desirable property that the swirling vortex of combustion gases emerging from the combustion chamber 303 is induced to form an imploding vortex as indicated by arrows Al which indicates the outer part of the imploding vortex, that follows the contour of the inside wall 332 toward the distal contracting end 333 of the plasma chamber. Due to the decreasing diameter of the plasma chamber in direction of the distal end 333, the speed of the plasma in the vortex increases. The wall of the distal end 333 is inward curved, causing the plasma to form a second inner vortex indicated by arrows A2, wherein the plasma reverses its axial direction of movement from right to left, while the rotational speed of the inner vortex A2 attains still higher speed. The inner vortex A2 is forced into a still diminishing diameter at the left hand end 334 of the plasma chamber as indicated by arrows A3 by the gas vortex emerging from the inlet aperture 308 from the combustion chamber. Due to the double vortex action in the plasma chamber, very high combustion temperatures are attained leading to a highly efficient combustion with a high carbon dioxide content of the residual combustion gases which escape through the exhaust outlet 336.

A central conductor 337 is threaded through the exhaust outlet 336, and operates as an anodic collector of cations of the plasma in the plasma chamber 331. The central conductor 337 is supported by suitably configured electrically insulated supports, not shown in this figure for the sake of clarity. The central conductor may be connected to an electrical apparatus similar to the one shown in FIG. 1*b* for tapping electrical energy from the combustion process and/or used for ignition as described earlier.

A plenum 316 surrounding the plasma chamber 331 serves to conduct a heat transfer medium entering at inlet 337*a* and exiting at outlet 338. The heat transfer medium may be a gas, e.g. atmospheric gas, or a liquid, e.g. water, as best suited for the particular application. The embodiment according to FIG. 1*c* is shown as having a spark plug 339 having its sparking electrode in the combustion vortex chamber 303.

Figure 2:
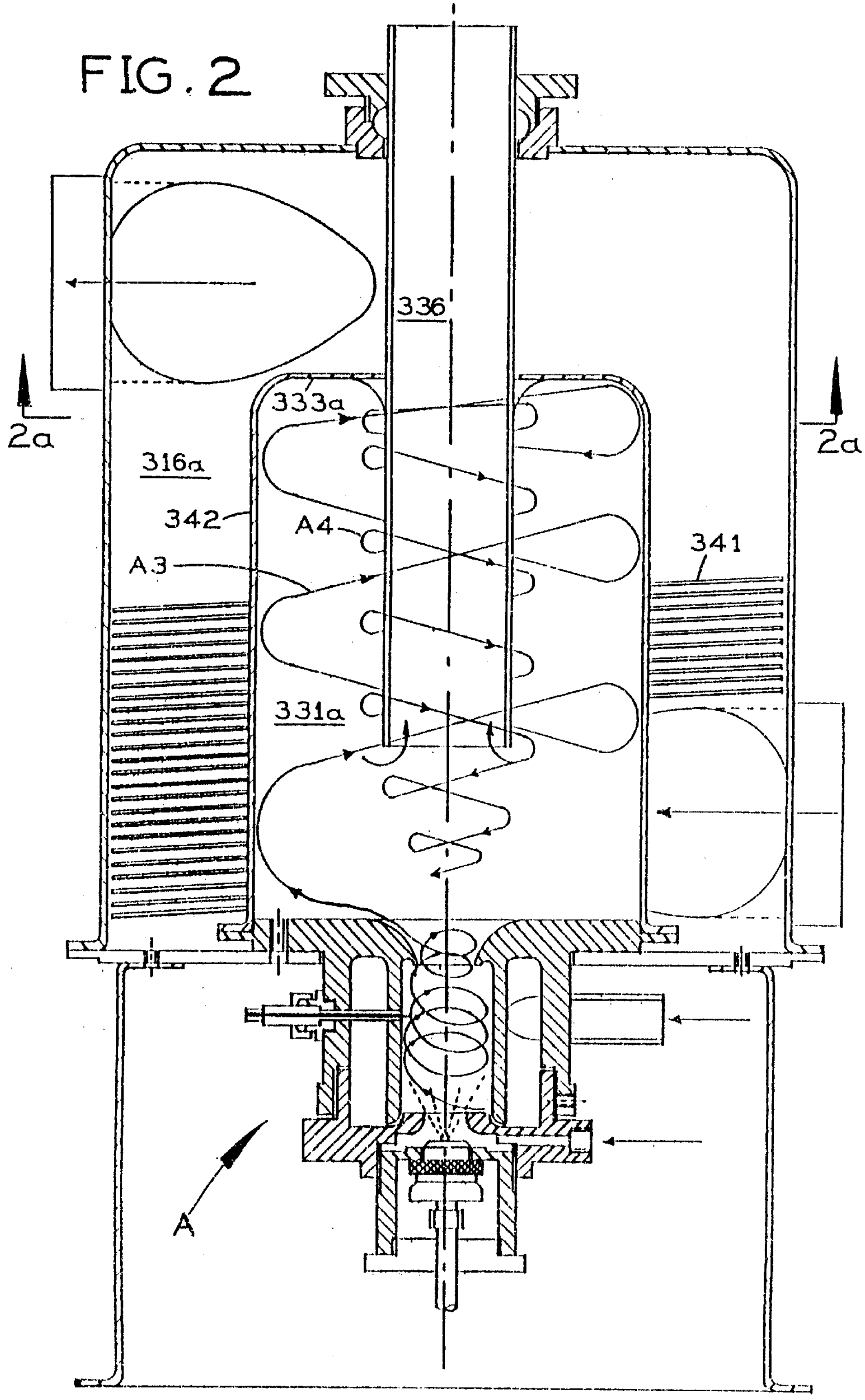
FIG. 2 is a cross-sectional view of the invention showing cylindrical tubular inner and outer walls of the plasma chamber and plenum, and the air supply tube within the pre-heating chamber assembly.

FIG. 2 shows a combuster according to the invention having a combustion chamber assembly A similar to the one shown in FIGS. 1*c* and 2, but having a plasma chamber 331*a* of substantially cylindrical construction.

The cylindrical plasma chamber 331*a* again has a partially rounded distal end 333*a*, which induces the formation of an imploding vortex indicated by arrows A3 and A4. The plenum 316*a* in this embodiment shows an array of heat fins 341 extending from the cylindrical outer surface 342 of the plasma chamber 331*a*. The heat fins 341 facilitate the transfer of heat from the plasma chamber 331*a* to the plenum 316*a*, thus allowing the combuster to be more compact while generating an equal amount of heat compared with the construction shown in FIG. 1*c*.

Figure 2A:
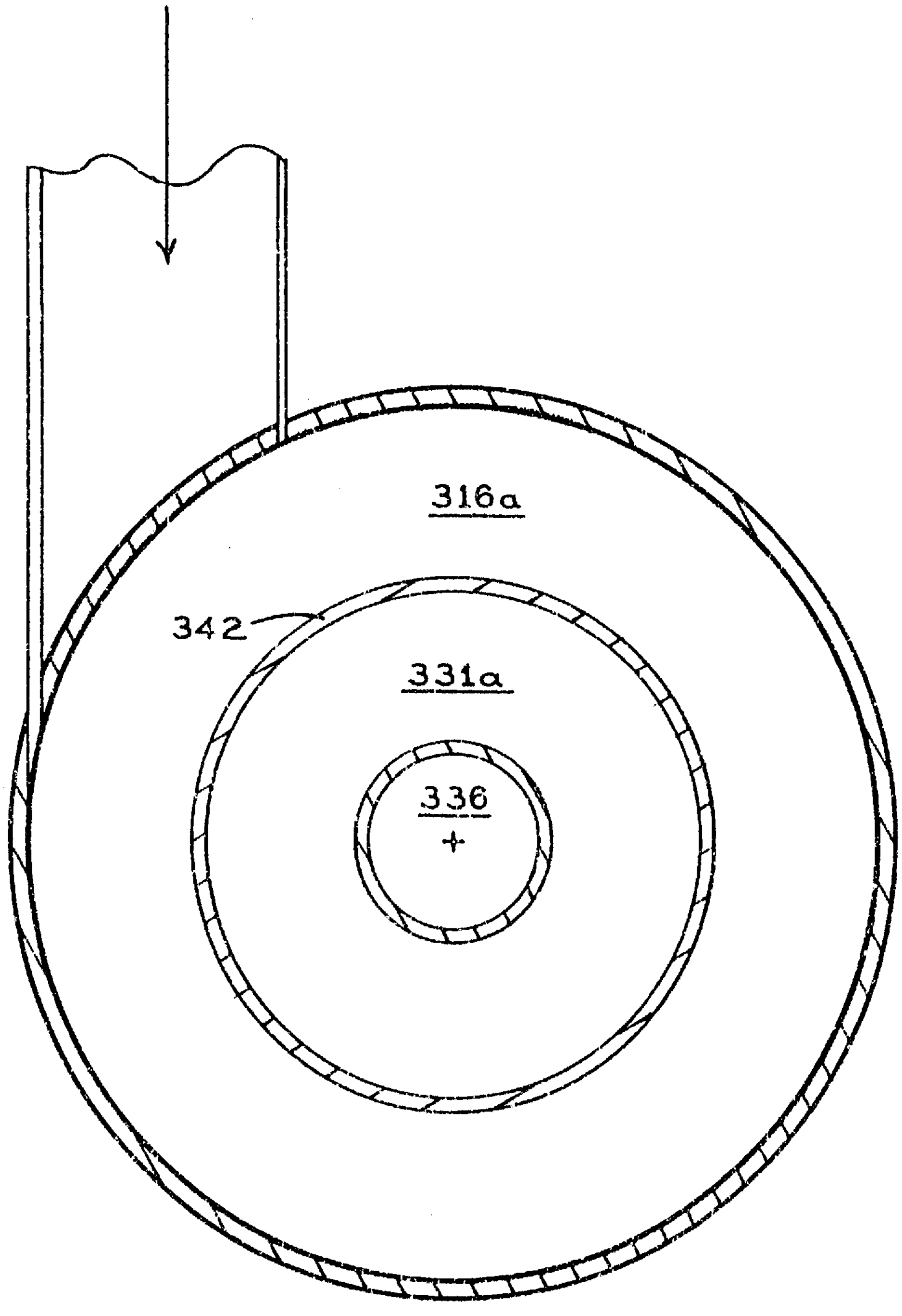
FIG. 2*a* is a cross-sectional view of the invention taken along the line 2*a*—2*a* of FIG. 2.

FIG. 2*a* is a cross-sectional view of the embodiment according to FIG. 2, seen along the line 2*a*—2*a* of FIG. 2. FIG. 2*a* shows the circular plenum 316*a*, surrounding the plasma chamber 331*a*, surrounding the exhaust outlet 336.

Figure 3:
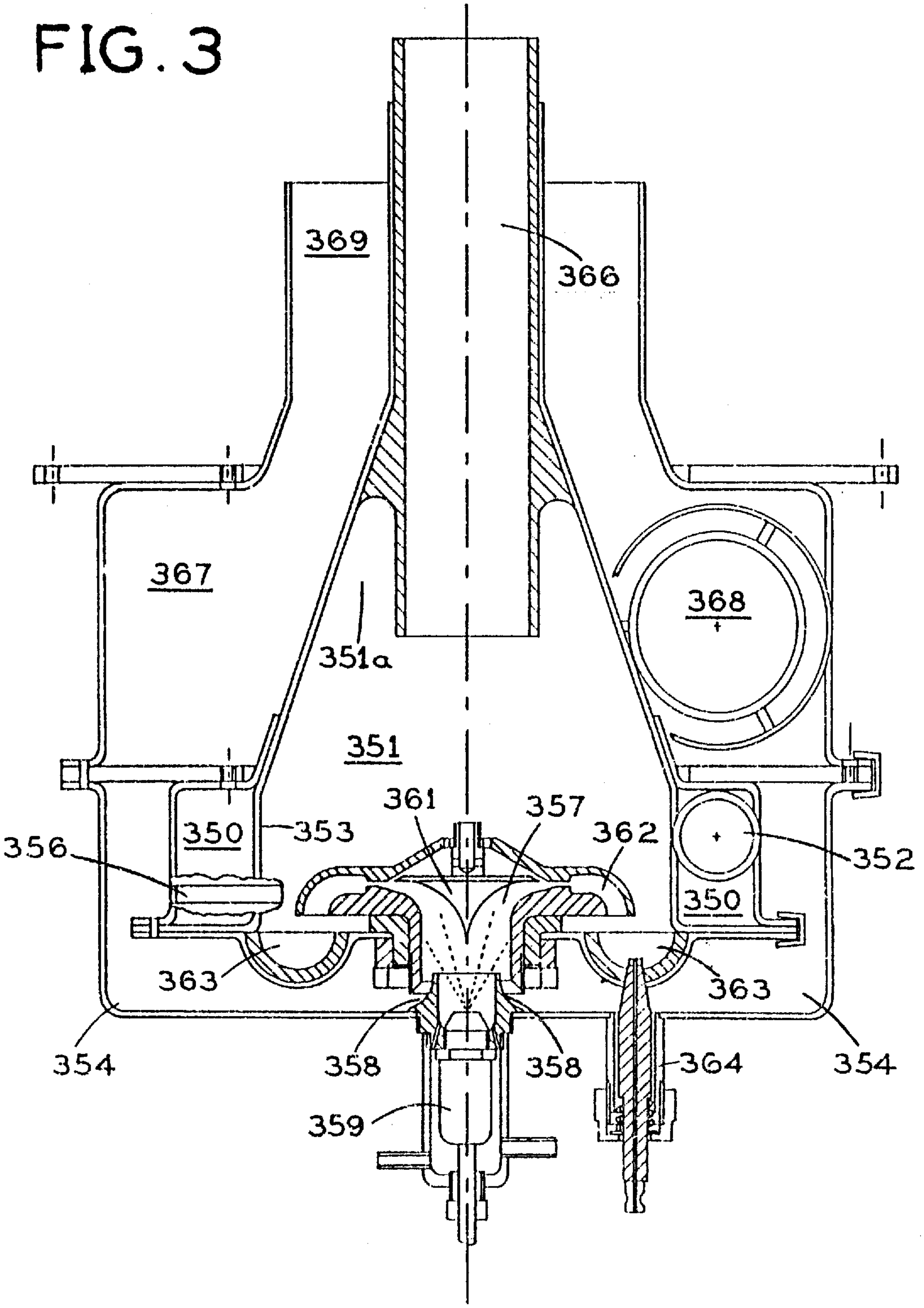
FIG. 3 is a cross-sectional side view of a second variation of the invention wherein the preheat chamber is divided into a small and a large part.

FIG. 3 shows an embodiment according to the invention, having a small circular preheat chamber 350 encircling the plasma chamber 351, and having a combustion air inlet 352 that feeds combustion air tangentially into the small preheat chamber 350, wherein the combustion air is partially preheated by heat transmitted through the wall 353 of the plasma chamber 351.

The partially preheated combustion air is set in circular motion due to the tangentially injected combustion air, and is transmitted into a disc-shaped large preheat chamber 354 via an elongated circular slot 356, only shown partially in the Figure. In the large preheat chamber 354, the combustion air is further preheated, while it is circulating in decreasing circles toward the center of the large preheat chamber 354. As a result of the expansion due to the preheating and being driven into smaller circles, the preheated air attains a high circular speed as it enters a premixing vortex chamber 357 through a circular entry slot 358 connecting the premixing vortex chamber 357 and the large preheat chamber 354. A fuel nozzle 359 injects fuel in finely dispersed liquid or gaseous form into the premixing vortex chamber 358, wherein the fuel and preheated combustion air is intimately combined.

The rapidly swirling fuel-air mixture is directed radially by a diverter 361 toward a large circular slot 362, from where it is driven into a large semi-toroidal combustion chamber 363, wherein the fuel-air mixture is ignited by a spark plug 364 connected to a source of ignition voltage, not shown. The ignited, rapidly expanding fuel-air mixture enters the perimeter of the frusto-conical plasma chamber 351 in a manner similar to that shown by arrows A1 in FIG. 1*c*, and proceeds in similar manner at increasingly rapidly rotating speed toward the right-hand end 351*a* from where it is reversed and returns as an imploding vortex as indicated by arrows A2 in FIG. 1*c* followed by the final vortex motion shown as arrows A3. After being completely combusted, the plasma escapes via exhaust outlet 366.

The combuster according to FIG. 3 also includes a plenum 367 with inlets and outlets 368,369 for circulating a heat transfer medium such as air or water for transferring the combustion heat to a designated heat sink.

It follows that the geometry of the plenum 367 is to be adapted to the particular heat transfer medium selected for the heat transfer. The plenum may have heat fins as shown in FIG. 2 or it may be configured as a coil or spool of tubing encircling the plasma chamber 351.

I claim:

1. A combustion system comprising:

a combustion chamber having a fuel inlet; a preheating chamber surrounding the combustion chamber having an air inlet for tangentially feeding combustion air to the preheating chamber, the combustion chamber having an adjustable elongate slot for admitting preheated air in circulating motion in a given direction of rotation to said combustion chamber, a plasma chamber coupled to said combustion chamber, and having an inlet aperture for receiving combusting fuel-air plasma from said combustion chamber, and an outlet aperture for expelling combusted gas, said plasma chamber having an inverted end wall surrounding said outlet aperture operative for forming an imploding vortex rotating in said given direction in said plasma chamber.

2. A combustion system according to claim 1, wherein said plasma chamber has an internal wall of substantially spherical shape, and a center.

3. A combustion system comprising:

a combustion chamber having a fuel inlet; a preheating chamber surrounding the combustion chamber having an air inlet for tangentially feeding combustion air to the preheating chamber, the combustion chamber having an elongate slot for admitting preheated air in circulating motion to said combustion chamber, a plasma chamber coupled to said combustion chamber, and having an inlet aperture for receiving combusting fuel-air plasma from said combustion chamber, and an outlet aperture for expelling combusted gas, said plasma chamber having an inverted end wall surrounding said outlet aperture operative for forming an imploding vortex in said plasma chamber, wherein said plasma chamber has an internal wall of substantially spherical shape, and a center; including a central sphere in said plasma chamber for generating standing waves in said plasma chamber, said central sphere having an inner cavity, a sonic tube fluidly connecting said cavity with said combustion chamber, said sonic tube operative for transmitting sonic waves from said cavity to said combustion chamber.

4. A combustion system according to claim 3, wherein said central sphere has a given outside diameter and said spherical chamber has a given inside diameter, wherein said inside and outside diameters have a given harmonic ratio, said harmonic ratio selected so as to induce standing waves in said spherical chamber.

5. A combustion chamber according to claim 3, wherein said sonic tube is terminated in said combustion chamber in an exponential horn facing away from said sonic tube, said exponential horn being operative for coupling sonic waves from said inner cavity to said combustion chamber.

6. A combustion chamber according to claim 1, wherein said inlet aperture has an expanding diameter expanding in direction to said plasma chamber.

7. A combustion system according to claim 1, including a plenum surrounding said plasma chamber for transferring heat from said plasma chamber to a heat transfer medium traversing said plenum.

8. A combustion system according to claim 1, including an ignition voltage source, and sparking means in said combustion chamber coupled to said ignition voltage source for igniting fuel air mixture circulating in said combustion chamber.

9. A combustion system according to claim 1, including an adjusting collar forming a common end wall of said preheating chamber and said combustion chamber, said adjusting collar being adjustable in direction away from said preheating chamber and combustion chamber for adjusting the width in axial direction of said elongate slot.

10. A combustion system according to claim 3, wherein said plasma chamber wall forms a cathode, said central sphere forms an anode, and further including an anodic reflecting element attached to said sonic tube, said anodic reflecting element being operative for reflecting ions from said combustion chamber.

* * * * *